(12) United States Patent
Wang et al.

(10) Patent No.: US 12,449,563 B1
(45) Date of Patent: Oct. 21, 2025

(54) STRESS SENSITIVITY ANALYSIS METHOD FOR FRACTURED GAS RESERVOIR

(71) Applicant: SouthWest Petroleum University, Chengdu (CN)

(72) Inventors: Nutao Wang, Chengdu (CN); Yue Cao, Chengdu (CN); Chengyang Zhang, Chengdu (CN); Hang Li, Chengdu (CN)

(73) Assignee: SouthWest Petroleum University, Chengdu (CN)

( * ) Notice: Subject to any disclaimer, the term of this patent is extended or adjusted under 35 U.S.C. 154(b) by 0 days.

(21) Appl. No.: 19/066,208

(22) Filed: Feb. 28, 2025

(30) Foreign Application Priority Data

Apr. 11, 2024 (CN) .......................... 202410433702.2

(51) Int. Cl.
*G01V 99/00* (2024.01)
*E21B 49/00* (2006.01)

(52) U.S. Cl.
CPC ............ *G01V 99/00* (2013.01); *E21B 49/006* (2013.01)

(58) Field of Classification Search
None
See application file for complete search history.

(56) References Cited

U.S. PATENT DOCUMENTS

2015/0355374 A1* 12/2015 Morton .................... G01V 1/50
703/10
2024/0027379 A1* 1/2024 Fu ............................ G01N 1/34

FOREIGN PATENT DOCUMENTS

| CN | 106383221 A | * | 2/2017 | ............. G01N 33/24 |
|----|-------------|---|--------|-----------------------|
| CN | 108133086 A | * | 6/2018 | ............. E21B 43/26 |
| CN | 109557280 A |   | 4/2019 | |
| CN | 115345402 A |   | 11/2022 | |
| CN | 116562177 A |   | 8/2023 | |
| JP | 2005233733 A |   | 9/2005 | |

OTHER PUBLICATIONS

CN108133086A translation (Year: 2018).*
CN115345402A translation, IDS reference (Year: 2022).*
CN106383221A translation (Year: 2017).*
SY/T5358-2002, Formation damage evaluation by flow test, Petroleum and Natural Gas Industry Standards of the People's Republic of China, 2002, State Economic and Trade Commission of the People's Republic of China.

* cited by examiner

*Primary Examiner* — Lina Cordero
(74) *Attorney, Agent, or Firm* — Addison D. Ault; IPGentleman Intellectual Property Services, LLC (57) ABSTRACT

A stress sensitivity analysis method for a fractured gas reservoir includes: S1, calculating a material balance quasi-time; S2, calculating a normalized production; S3, calculating a single well controlled reserve; S4, analyzing and judging a stress sensitivity. Based on the normalized quasi-pressure and quasi-time, the gas well test analysis is carried out, and the stress sensitivity of the actual reservoir is determined by taking the original bottom hole flowing pressure of the actual reservoir as the starting point, the obtained reservoir stress sensitivity is more in line with the actual situation of the reservoir, and the obtained reservoir stress sensitivity is more accurate, which provides more valuable values for reservoir protection, oilfield development, and development planning.

3 Claims, 3 Drawing Sheets

STRESS SENSITIVITY ANALYSIS METHOD FOR FRACTURED GAS RESERVOIR

CROSS REFERENCE TO THE RELATED APPLICATIONS

This application is based upon and claims priority to Chinese Patent Application No. 202410433702.2, filed on Apr. 11, 2024, the entire contents of which are incorporated herein by reference.

TECHNICAL FIELD

The invention relates to the field of oil and gas exploitation technology, which is a stress sensitivity analysis method for a fractured gas reservoir.

BACKGROUND

Stress sensitivity is the process of establishing a new pressure equilibrium state after the original stress equilibrium state of solid particles in porous media is broken due to the decrease of pore pressure in the reservoir during the exploitation of oil and gas reservoirs, it is also the process of rock deformation and fluid seepage coupling. The pore space of the reservoir after stress sensitivity is compressed and deformed, and the seepage effect is changed, the macroscopic performance is the decrease of permeability, thereby affecting the output of oil and gas, resulting in a decrease in production.

In recent years, there have been many studies on stress sensitivity, but its evaluation experimental methods and evaluation indicators are still in research and exploration. The oil industry standard SY/T5358-2002 reservoir sensitivity flow experiment evaluation method has an experimental method for stress sensitivity evaluation, in addition, other existing experimental methods and evaluation indicators for stress sensitivity evaluation are mainly for sandstone reservoirs. The experimental methods for evaluating the stress sensitivity of fractured reservoirs are mainly the following methods:

1) The natural fractured cores are selected, the geometric sizes of the fractured rock samples are accurately measured, the dry weights of rock samples are weighed, and the nitrogen permeability is measured;
2) the fractured rock samples are saturated with standard salt water in a vacuum, and then the wet weight of the rock samples is weighed and the porosity is calculated;
3) the rock sample is put into the core holder, first, the standard salt water is used for displacement, and the salt water permeability is measured after the pressure is stable;
4) the irreducible water saturation is established by kerosene displacement, and then the oil phase permeability of the fractured rock samples under different effective stress conditions is measured, the pump flow rate is fixed at 0.8 times the critical flow rate, and the confining pressure is controlled at 1-24 MPa;
5) the relationship curve between permeability and effective stress of the fractured rock samples is drawn by computer, and the stress-sensitive damage degree is calculated.

At present, there is no recognized quantitative index for evaluating stress sensitivity at home and abroad, therefore, only qualitative evaluation of stress sensitivity can be carried out. Moreover, the fractures of carbonate reservoirs are relatively more developed than sandstone reservoirs. It is difficult to obtain cores with more developed fractures during the experiment. Even if the cores are taken, they can only reflect some small fractures or porous reservoirs. Therefore, it is difficult to evaluate the stress sensitivity characteristics of fractured reservoirs through core experiments. In addition, there is no better experiment or method to evaluate the stress sensitivity characteristics of fractured reservoirs.

SUMMARY

The invention is intended to provide a stress sensitivity analysis method for a fractured gas reservoir to objectively and accurately evaluate the stress sensitivity characteristics of the fractured reservoirs.

In order to achieve the above purpose, the invention provides the following technical scheme:

A stress sensitivity analysis method for a fractured gas reservoir, including the following steps:

S1, calculating a material balance quasi-time $t_{ca}$ setting a single well controlled reserve G, and calculating a material balance time for each production data point:

$$t_{ca} = \frac{Gc_{ti}}{q}(p_{p_i} - p_p)$$

where G is the single well controlled reserve, 100 million cubic meters; $c_{t_i}$ is an initial comprehensive compression coefficient; q is a daily output of a single well, $m^3/ks$; $p_p$ is a normalized formation pressure, MPa; $p_{pi}$ is an initial pressure of the regularized formation, MPa; where:

$$\frac{p}{Z} = \left(\frac{p}{Z}\right)_i \left(1 - \frac{G_p}{G}\right)$$

where $G_p$ is a cumulative gas production of natural gas, 100 million cubic meters, G is the single well controlled reserve, 100 million cubic meters;

S2, calculating a normalized production $$\frac{q}{\Delta p_p} = \frac{q}{\left(p_{p_i} - p_{p_{wf}}\right)}$$

where $p_{p_{wf}}$ is a normalized bottom hole flowing pressure, MPa;

S3, calculating the single well controlled reserve G drawing a relationship curve of $$\frac{\left(p_{p_i} - p_{p_{wf}}\right)}{q} - t_{ca},$$

and determining G according to a line slope m, an expression is:

$$G = \frac{1}{mc_{ti}}$$

S4, analyzing and judging a stress sensitivity setting a solution stress sensitivity coefficient α, $J_{gi}$, first calculating $J_g$ by a following formula:

$$J_g = \frac{q}{(p_p - p_{p_{wf}})} = \frac{2\pi k_i h e^{-\alpha(p_i-p)}}{(\mu B_g)_i \left[\frac{1}{2}\ln\left(\frac{4A}{C_A e^\gamma r_w^2}\right)\right]} = J_{gi} e^{-\alpha(p_i-p)}$$

then establishing an optimized objective function according to $$J_g^* = \frac{q}{p_p - p_{p_{wf}}},$$

so that:

$$M = \min \sum_{i=1}^{n} (J_g - J_g^*)^2$$

repeating S1-S3, and performing an objective optimization in a G iteration until a convergence satisfies an allowable error of G;

finally, calculating a reservoir damage $$SI_p^k$$

by the stress sensitivity coefficient α of the objective function of a nonlinear solution method; where when α is smaller, $J_g$ is closer to an initial $J_{gi}$, and calculating an average of $$J_{gave} = \frac{1}{n}\sum_{i=1}^{n} J_g;$$

if $J_{gave}$ is closer to $J_g$, the stress sensitivity is weaker, on the contrary, the stress sensitivity is stronger.

Furthermore, in S1, a calculation expression of the normalized formation pressure $p_p$ is as follows:

$$p_p = \left(\frac{\mu Z}{p}\right)_i \int_0^p \frac{p}{\mu Z} dp$$

where i—denotes an initial state; p is a pressure, MPa; μ is a gas viscosity, mPa·s; z is a gas deviation factor, dimensionless.

Furthermore, in S4, a calculation expression of a stress sensitivity damage degree $$SI_p^k$$

is as follows:

$$SI_p^k = \frac{k_i - k}{k_i} = 1 - e^{-\alpha \Delta \sigma}$$

where $k_i$ is an initial permeability, m²; K is a permeability under arbitrary stress, m²; Δσ is an effective stress change value, MPa; α is the stress sensitivity coefficient, MPa⁻¹;

where a quantitative index for evaluating stress sensitivity is when $$SI_p^k$$

is 0-0.1, 0.1-0.3, 0.3-0.5, and >0.5, damage degrees are weak, medium, strong, and super strong, respectively.

The beneficial effects of the technical scheme are as follows:

The invention provides a stress sensitivity analysis method for a fractured gas reservoir, based on the normalized quasi-pressure and quasi-time, the gas well test analysis is carried out, and the stress sensitivity of the actual reservoir is determined by taking the original bottom hole flowing pressure of the actual reservoir as the starting point, the obtained reservoir stress sensitivity is more in line with the actual situation of the reservoir, and the obtained reservoir stress sensitivity is more accurate, which provides more valuable values for reservoir protection, oilfield development and development planning.

DETAILED DESCRIPTION OF THE EMBODIMENTS

The following is a further detailed description of the invention in combination with the figures and an embodiment:

A stress sensitivity analysis method for the fractured gas reservoirs, including the following steps:

S1, calculating the material balance quasi-time $t_{ca}$ the single well controlled reserve G is set, and the material balance time for each production data point is calculated:

$$t_{ca} = \frac{Gc_{ti}}{q}(p_{p_i} - p_p)$$

where G is the single well controlled reserve, 100 million cubic meters; $c_{t_i}$ is the initial comprehensive compression coefficient; q is the daily output of a single well, m³/ks; $p_p$ is the normalized formation pressure, MPa; $p_{pi}$ is the initial pressure of the regularized formation, MPa; where:

$$\frac{p}{Z} = \left(\frac{p}{Z}\right)_i \left(1 - \frac{G_p}{G}\right)$$

where $G_p$ is the cumulative gas production of the natural gas, 100 million cubic meters, G is the single well controlled reserve, 100 million cubic meters;

the calculation expression of the normalized formation pressure $p_p$ is as follows:

$$p_p = \left(\frac{\mu Z}{p}\right)_i \int_0^p \frac{p}{\mu Z} dp$$

where i—denotes the initial state; p is the pressure, MPa; μ is the gas viscosity, mPa·s; z is the gas deviation factor, dimensionless;

S2, calculating the normalized production $$\frac{q}{\Delta p_p} = \frac{q}{\left(p_{p_i} - p_{p_{wf}}\right)}$$

where $p_{p_{wf}}$ is the normalized bottom hole flowing pressure, MPa;

S3, calculating the single well controlled reserve G the relationship curve of $$\frac{\left(p_{p_i} - p_{p_{wf}}\right)}{q} - t_{ca}$$

is drawn, and G is determined according to the line slope m, the expression is:

$$G = \frac{1}{mc_{ti}}$$

S4, analyzing and judging the stress sensitivity the solution stress sensitivity coefficient α, $J_{gi}$ is set, first, $J_g$ is calculated by the following formula:

$$J_g = \frac{q}{\left(p_p - p_{p_{wf}}\right)} = \frac{2\pi k_i h e^{-\alpha(p_i-p)}}{(\mu B_g)_i \left[\frac{1}{2}\ln\left(\frac{4A}{C_A e^\gamma r_w^2}\right)\right]} = J_{gi} e^{-\alpha(p_i-p)}$$

then the optimized objective function is established according to $$J_g^* = \frac{q}{p_p - p_{p_{wf}}},$$

so that:

$$M = \min \sum_{i=1}^n (J_g - J_g^*)^2$$

S1-S3 are repeated, and the objective optimization is performed in the G iteration until the convergence satisfies the allowable error of G;

finally, calculating the reservoir damage $$SI_p^k$$

by the stress sensitivity coefficient α of the objective function of the nonlinear solution method; where the calculation expression of the stress sensitivity damage degree $$SI_p^k$$

is as follows:

$$SI_p^k = \frac{k_i - k}{k_i} = 1 - e^{-\alpha \Delta \sigma}$$

where $k_i$ is the initial permeability, μm²; K is the permeability under arbitrary stress, μm²; Δσ is the effective stress change value, MPa; α is the stress sensitivity coefficient, MPa⁻¹.

where the quantitative index for evaluating stress sensitivity is when $$SI_p^k$$

is 0-0.1, 0.1-0.3, 0.3-0.5, and >0.5, the damage degrees are weak, medium, strong, and super strong, respectively.

When α is smaller, $J_g$ is closer to the initial $J_{gi}$, and the average $$J_{gave} = \frac{1}{n}\sum_{i=1}^n J_g$$

is calculated; if $J_{gave}$ is closer to $J_g$, the stress sensitivity is weaker, on the contrary, the stress sensitivity is stronger.

The basic principle is as follows:

Based on the normalized quasi-pressure and quasi-time, the gas well test analysis is carried out, and all the liquid well test analysis theories are applied to the gas well test.

The normalized quasi-pressure is defined as:

$$p_p = \left(\frac{\mu Z}{p}\right)_i \int_0^p \frac{p}{\mu Z} dp \quad (1)$$

where i denotes the initial state; $p_p$ is the normalized formation pressure, MPa; p is the pressure, MPa; μ for gas viscosity, mPa·s; z is the gas deviation factor, dimensionless.

The material balance quasi-time is defined as:

$$t_{ca} = \frac{(\mu c_t)_i}{q} \int_0^t \frac{q}{\mu c_t} dt \quad (2)$$

where $c_t$ is the comprehensive compression coefficient, 1/MPa, $c_t = c_p + c_{gi} \cdot (1-s_{wc}) + c_w s_{wc}$; $c_p$ is the rock pore compression coefficient, 1/MPa, $c_w$ is the formation water compression coefficient, 1/MPa, $c_{gi}$ is the initial compression coefficient of natural gas, 1/MPa, $s_{wc}$ is the irreducible water saturation.

according to the physical parameters of natural gas:

$$c_g = \frac{d\rho}{\mu d p} = \frac{ZRT}{pM_g}\frac{d}{dp}\left(\frac{pM_g}{ZRT}\right) = \frac{Z}{p}\frac{d}{dp}\left(\frac{p}{Z}\right) \quad (3)$$

where $c_g$ is the compression coefficient of natural gas, 1/MPa.

According to the constant volume material balance equation:

$$\frac{p}{Z} = \left(\frac{p}{Z}\right)_i \left(1 - \frac{G_p}{G}\right) \quad (4)$$

where $G_p$ is the cumulative gas production of natural gas, and G is the single well controlled reserve.

According to Formula (3), the following is obtained:

$$q = -\left(\frac{Z}{p}\right)_i \frac{Gd}{dt}\left(\frac{p}{Z}\right) = -\left(\frac{Z}{p}\right)_i \frac{Gd}{dp}\left(\frac{p}{Z}\right)\frac{dp}{dt} \quad (5)$$

$$q = -\left(\frac{Z}{p}\right)_i \frac{Gd}{dt}\left(\frac{p}{Z}\right) = -\left(\frac{Z}{p}\right)_i \frac{Gc_g}{Z}\frac{dp}{dt} \quad (6)$$

Formula (1) and Formula (2) are combined to obtain the following:

$$t_{ca} = -\frac{G}{q}\left(\frac{\mu Z c_t}{p}\right)_i \int_{p_i}^{p} \frac{q}{Z\mu} dt \quad (7)$$

$$t_{ca} = -\frac{G c_{ti}}{q}(p_{p_i} - p_p) \quad (8)$$

$$\frac{(p_{p_i} - p_p)}{q} = \frac{t_{ca}}{G c_{ti}} \quad (9)$$

After the gas single-phase flow enters the quasi-steady state, the quasi-pressure solution is expressed as:

$$\frac{(p_p - p_{p_{wf}})}{q} = \frac{(\mu B_g)_i}{2\pi k h}\left[\frac{1}{2}\ln\left(\frac{4A}{C_A e^\gamma r_w^2}\right)\right] \quad (10)$$

where $C_A$ is the shape factor; $\gamma = e^{0.5772^1} = 1.781$; A is the single well control area, m²; $r_w$ is the well radius, m; $B_g$ is the gas volume coefficient, dimensionless; q is the daily output of the single well, m³/ks; $p_{p_{wf}}$ is the normalized bottom hole flowing pressure, MPa; k is the reservoir permeability, μm²; h is the effective thickness of the reservoir, m.

According to Formula (9) and Formula (10) the following is obtained:

$$\frac{(p_{p_i} - p_{p_{wf}})}{q} = \frac{t_{ca}}{G c_{ti}} + \frac{(\mu B_g)_i}{2\pi k h}\left[\frac{1}{2}\ln\left(\frac{4A}{C_A e^\gamma r_w^2}\right)\right] \quad (11)$$

Let $m_a = \frac{1}{Gc_{ti}}$, $b_{apss} = \frac{(\mu B_g)_i}{2\pi k h}\left[\frac{1}{2}\ln\left(\frac{4A}{C_A e^\gamma r_w^2}\right)\right]$, get:

$$G = \frac{1}{m_a c_{ti}} \quad (12)$$

It is assumed that the gas well begins to change production continuously, and the pressure wave propagates outward continuously. At this time, the formation pressure is still the original formation pressure, that is:

$$q_g = \frac{2h(p_{p_i} - p_{p_{wf}})}{(\mu B_g)_i \left(\ln\frac{r_t}{r_w} + s\right)} \quad (13)$$

where $r_t$ is the propagation distance of the pressure wave with time before it reaches the boundary, m; s is the skin factor, dimensionless.

With the increase of production, the quasi-pressure difference also increases, when the production cannot be stabilized, that is, the formation pressure cannot maintain the original formation pressure, when the pressure wave reaches the boundary $r_t = r_e$, there is no fluid supplement in the periphery, and the formation pressure begins to decrease, resulting in a decrease in production, under the premise of not changing the working system, there is always a time point to reach the highest production, recorded as $q_{gmax}$, at this time, the corresponding bottom hole flowing pressure $p_{p_{wf}}$ should be the smallest, recorded as $p_{p_{wfmin}}$, at this time:

$$J_{gi} = \frac{q_g}{p_{p_i} - p_{p_{wfmin}}} = \frac{2\pi k h}{(\mu B_g)_i \left(\frac{1}{2}\ln\frac{4A}{C_A e^\gamma r_w^2} + s\right)} = const \quad (14)$$

When the pressure wave reaches the boundary, the following result is obtained from Formula (14):

$$J_g = \frac{g}{(p_p - p_{p_{wf}})} = \frac{2\pi k h}{(\mu B_g)_i \left[\frac{1}{2}\ln\left(\frac{4A}{C_A e^\gamma r_w^2}\right) + s\right]} \quad (15)$$

If the change of reservoir physical parameters is not considered, that is, the reservoir has no stress sensitivity or weak stress sensitivity, $J_g = J_{gi} = const$ can be obtained from Formula (14) and Formula (15).

If the reservoir has stress sensitivity, the permeability of the reservoir decreases with the change of stress, and the physical properties of the reservoir generally meet the exponential change with the change of stress, that is, $k = k_i e^{-\alpha(p_i - p)}$, Formula (14) is rewritten as:

$$J_g = \frac{q}{(p_p - p_{p_{wf}})} = \frac{2\pi k_i h e^{-\alpha(p_i - p)}}{(\mu B_g)_i \left[\frac{1}{2}\ln\left(\frac{4A}{C_A e^\gamma r_w^2}\right)\right]} = J_{gi} e^{-\alpha(p_i - p)} \quad (16)$$

The specific calculation method is as follows:

(1) Calculating the Material Balance Quasi-Time

Firstly, it is assumed that a single well control reserve G, the material balance time is calculated for each production data point:

$$t_{ca} = \frac{(\mu c_t)_i}{q} \int_0^t \frac{q}{\mu(\bar{p})c_t(\bar{p})} dt = \frac{Gc_{ti}}{q}(p_{p_i} - p_p) \quad (17)$$

the average formation pressure is calculated by Equation (4).

(2) Calculating the Normalized Production $$\frac{q}{\Delta p_p} = \frac{q}{(p_{p_i} - p_{p_{wf}})} \quad (18)$$

(3) the relationship curve of $$\frac{(p_{p_i} - p_{p_{wf}})}{q} - t_{ca}$$

is drawn, and G is determined according to the line slope m, that is, $$G = \frac{1}{mc_{ti}} \quad (19)$$

(4) (1)-(3) are repeated for iterative calculation until convergence, the allowable error of G is satisfied.

(5) assuming a $\alpha$, $J_{gi}$, $J_g$ is calculated by Equation (16), and then $$J_g^* = \frac{q}{p_p - p_{p_{wf}}}$$

is calculated according to the formation pressure and bottom hole flowing pressure calculated by Equation (4), the optimized objective function is established:

$$M = \min \sum_{i=1}^{n} (J_g - J_g^*)^2 \quad (20)$$

The stress sensitivity coefficient $\alpha$ of the objective function is solved by the nonlinear solution method, and then the calculation expression of reservoir damage $$SI_p^k$$

is calculated, the calculation expression of $$SI_p^k$$

is as follows:

$$SI_p^k = \frac{k_i - k}{k_i} = 1 - e^{-\alpha \Delta \sigma}$$

where $k_i$ is the initial permeability, m²; K is the permeability under arbitrary stress, m²; $\Delta \sigma$ is the effective stress change value, MPa; a is the stress sensitivity coefficient, MPa⁻¹;

where the quantitative index for evaluating stress sensitivity is when $$SI_p^k$$

is 0-0.1, 0.1-0.3, 0.3-0.5, and >0.5, the damage degrees are weak, medium, strong, and super strong, respectively;

when $\alpha$ is smaller, $J_g$ is closer to the initial $J_{gi}$, and the average $$J_{gave} = \frac{1}{n}\sum_{n=1}^{n} J_g$$

is calculated; if $J_{gave}$ is closer to $J_g$, the stress sensitivity is weaker, on the contrary, the stress sensitivity is stronger.

Embodiment

Well X1 is a fractured gas well in Xinjiang, China, the basic data of this well are shown in Table 1:

TABLE 1

Basic data of Well X1

| Name | Numerical value | Unit |
|---|---|---|
| Original formation pressure | 125.0 | MPa |
| Gas reservoir temperature | 141.4 | ° C. |
| Relative density of natural gas | 0.56 | decimal |
| Critical pressure | 4.5 | MPa |
| Critical temperature | −70 | ° C. |
| Irreducible water saturation | 0.33 | decimal |
| Water compression coefficient | 0.0004 | 1/MPa |
| Rock compression coefficient | 0.00041 | 1/MPa |
| Ground temperature gradient | 0.02 | °C/m |
| Zi | 2.019 | |
| $c_{gi}$ | 0.00262 | |

Figure 1:
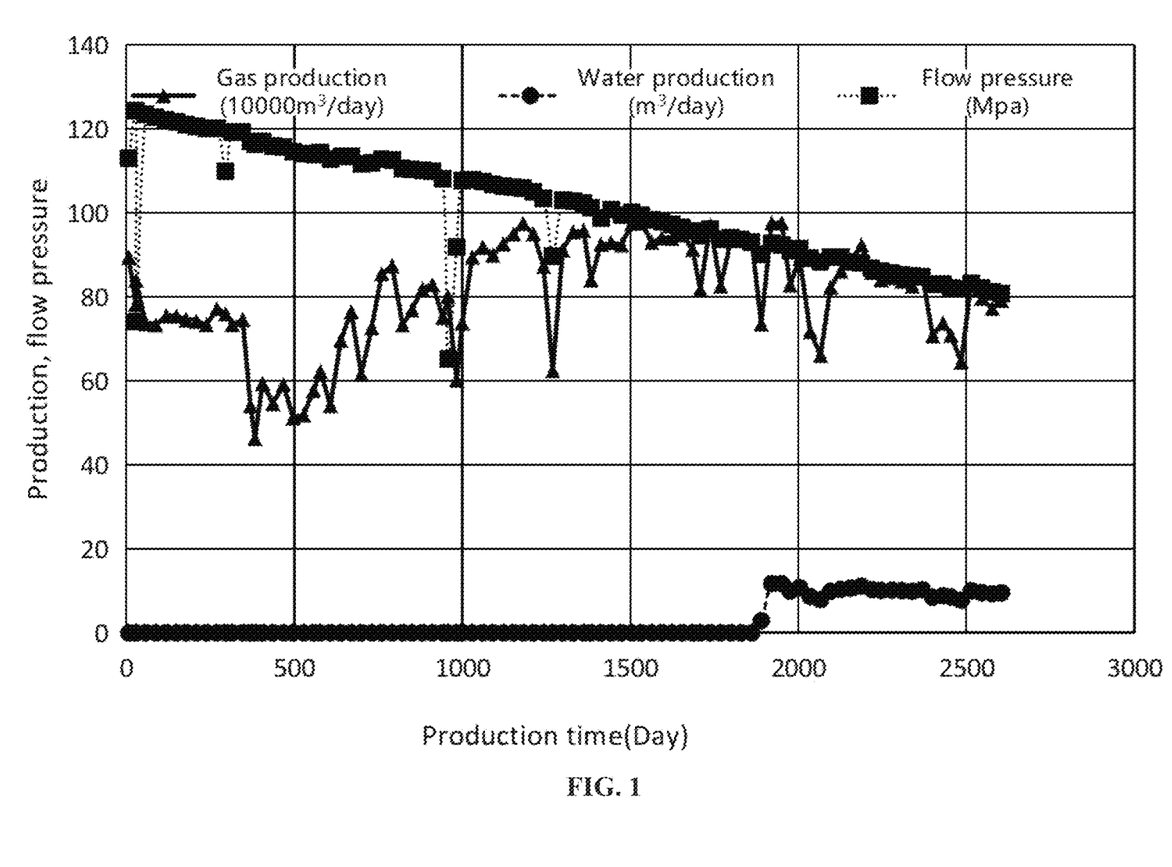
FIG. 1 is a production curve of the X1 gas well in the embodiment of the invention.
Figure 2:
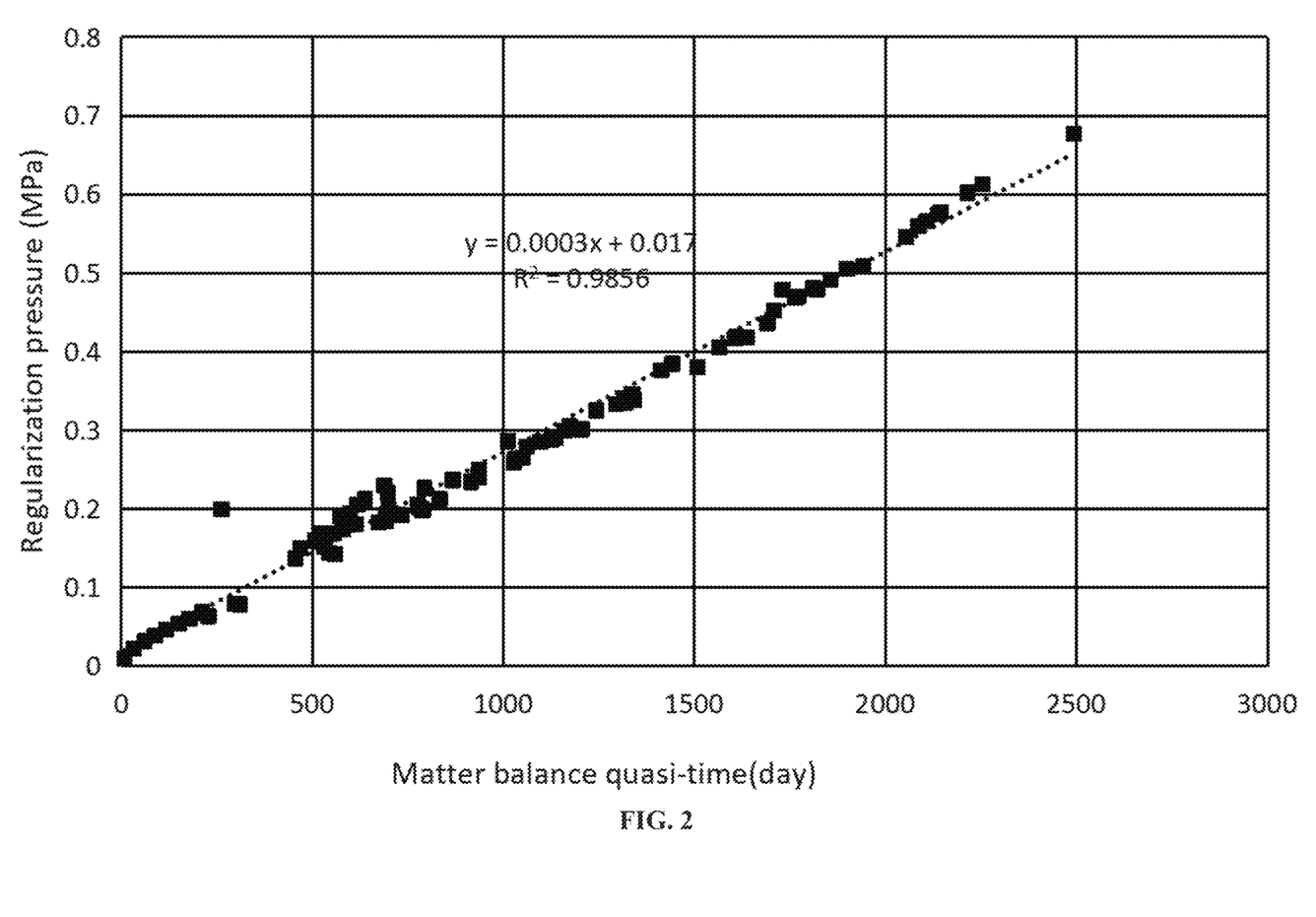
FIG. 2 is an analysis curve of the single well controlled reserve in the embodiment of the invention.
Figure 3:
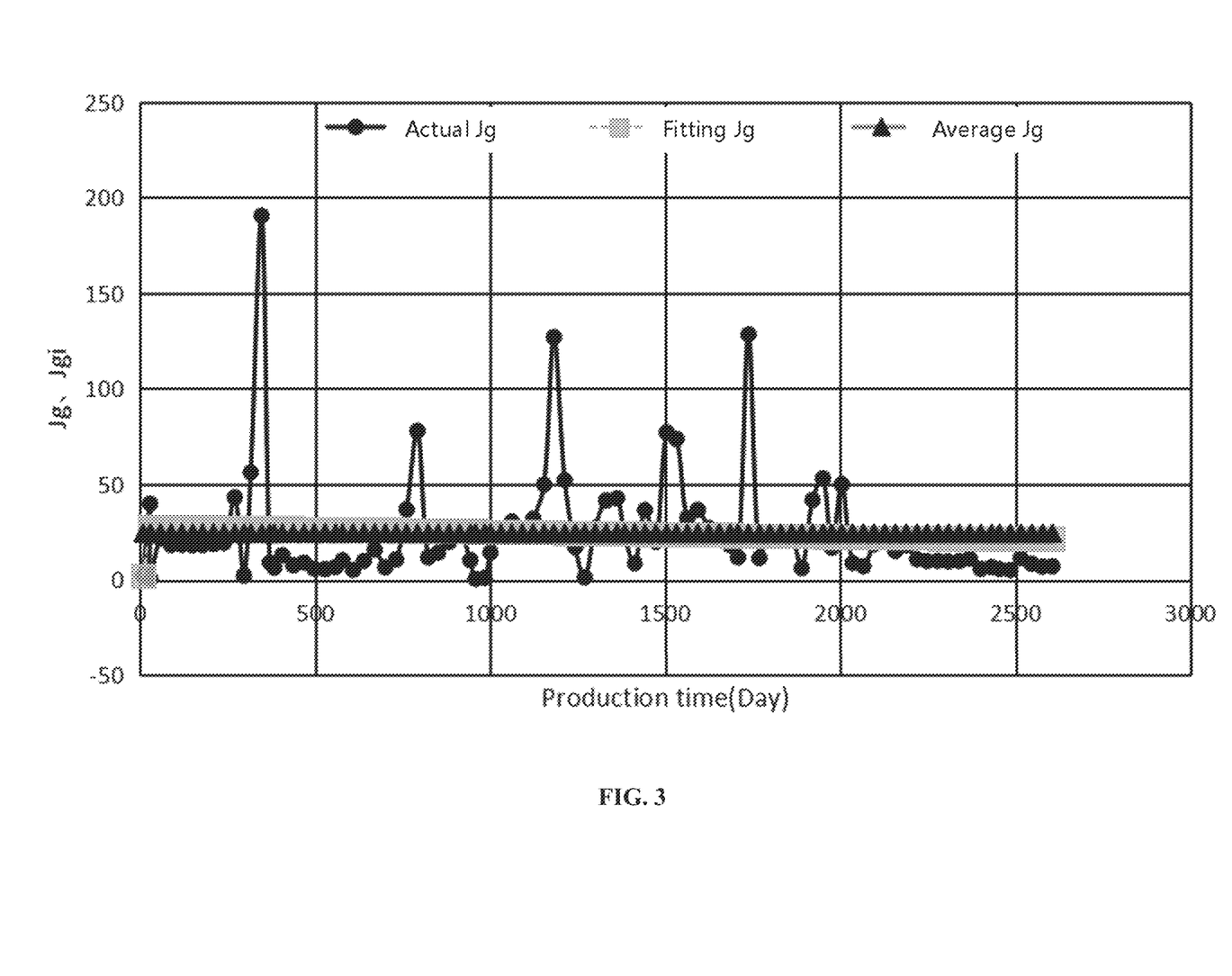
FIG. 3 is a stress sensitivity index analysis curve in the embodiment of the invention.

Water is produced after 1889 days of production, the production curve is shown in FIG. 1, the flow pressure decreases rapidly after water production, and the gas phase permeability decreases due to water production. Therefore, the production data of water-gas ratio less than 1 m³/10⁴ m³ are selected by the analysis formula to reduce the influence of water on reservoir stress sensitivity analysis. According to steps (1)-(3), the single well controlled reserves G=15.38 billion square; it can be seen from FIG. 2 that the correlation coefficient of the analysis curve is high, which indicates that the analysis of the single well controlled reserve is relatively reliable, then, the nonlinear regression is carried out by using Equation (20), the fitting curves of $J_g$ and $J_{gi}$ are shown in FIG. 3, $J_g$ and $J_{gave}$ are very close, and the reservoir stress sensitivity is weak, $\alpha$=0.00204 1/MPa, the maximum $$SI_p^k = 0.0807,$$

indicating that the reservoir stress sensitivity is weak.

The above-mentioned is only the embodiment of the invention, and the common sense of the specific technical scheme or characteristics known in the scheme is not described in detail here. It should be pointed out that for the technical personnel in this field, some deformations and improvements can be made without deviating from the technical scheme of the invention. These deformations and improvements should also be regarded within the protection scope of the invention, which will not affect the effect of the implementation of the invention and the practicability of the patent. The scope of protection required by this application should be based on the content of its claims, and the specific implementation method in the specification can be used to explain the content of the claims.

What is claimed is:

1. A stress sensitivity analysis method for a fractured gas reservoir, comprising the following steps:

S1, calculating a material balance quasi-time $t_{ca}$, comprising:
setting a single well controlled reserve G, and calculating the material balance quasi-time for each production data point:

$$t_{ca} = \frac{Gc_{ti}}{q}(p_{p_i} - p_p)$$

wherein G is the single well controlled reserve in 100 million cubic meters (m³); $c_{t_i}$ is an initial comprehensive compression coefficient; q is a daily production rate of a single well in cubic meters per second (m³/s); $p_p$ is a pressure of a normalized formation in megapascals (MPa); and $p_{p_i}$ is an initial pressure of the normalized formation in MPa; wherein:

$$\frac{p}{Z} = \left(\frac{p}{Z}\right)_i \left(1 - \frac{G_p}{G}\right)$$

wherein p is a pressure of the fractured gas reservoir in MPa; Z is a gas deviation factor, dimensionless; i is an initial state; $G_p$ is a cumulative gas production of natural gas in 100 million cubic meters; and G is the single well controlled reserve in 100 million cubic meters;

S2, calculating a normalized production:

$$\frac{q}{\Delta p_p} = \frac{q}{p_{p_i} - p_{p_{wf}}}$$

wherein $\Delta p_p$ is a change in the pressure of the normalized formation; $p_{p_{wf}}$ is a normalized bottom hole flowing pressure in MPa;

S3, calculating the single well controlled reserve G comprising:
drawing a relationship curve of $$\frac{(p_{p_i} - p_{p_{wf}})}{q} - t_{ca},$$

and determining the single well controlled reserve G according to a line slope m, wherein G is expressed as:

$$G = \frac{1}{mc_{ti}}$$

S4, analyzing and judging a stress sensitivity comprising:
setting a solution stress sensitivity coefficient α, an initial objective function $J_{gi}$, and calculating an objective function $J_g$ by a following formula:

$$J_g = \frac{q}{(p_p - p_{p_{wf}})} = \frac{2\pi k_i h e^{-a(p_i - p)}}{(\mu B_g)_i \left[\frac{1}{2}\ln\left(\frac{4A}{C_A e^\gamma r_w^2}\right)\right]} = J_{gi} e^{-a(p_i - p)}$$

wherein $k_i$ is an initial permeability in square micrometers (μm²); h is an effective thickness of the fractured gas reservoir; μ is a gas viscosity in millipascal·second (mPa·s); $B_g$ is a gas volume coefficient, dimensionless; A is a single well control area in square meters (m²); $C_A$ is a shape factor; γ=0.57721 is an Euler-Mascheroni constant; $r_w$ is a well radius in meters (m); and establishing an optimized objective function M according to an inversion of $I_g$ represented as $$J_g^* = \frac{q}{p_p - p_{p_{wf}}},$$

so that:

$$M = \min \sum_{i=1}^{n}(J_g - J_g^*)^2$$

wherein n is a number of production data points;
repeating S1-S3, and performing an objective optimization in a G iteration until a convergence satisfies an allowable error of G;
finally, calculating a reservoir damage $$SI_p^k$$

by the solution stress sensitivity coefficient α of the objective function M of a nonlinear solution method, wherein when α is decreased, $J_g$ approaches the initial objective function $J_{gi}$; and calculating an average of $J_g$ as:

$$J_{gave} = \frac{1}{n}\sum_{i=1}^{n}J_g,$$

wherein when $J_{gave}$ approaches $J_g$; the stress sensitivity is weaken, otherwise the stress sensitivity is strengthen.

2. The stress sensitivity analysis method for the fractured gas reservoir according to claim 1, wherein in S1, a calculation expression of the pressure of the normalized formation $p_p$ is as follows:

$$p_p = \left(\frac{\mu Z}{p}\right)_i \int_0^p \frac{p}{\mu Z}dp$$

wherein i denotes the initial state; p is the pressure of the fractured gas reservoir in MPa; µ is the gas viscosity in mPa·s; and Z is the gas deviation factor, dimensionless.

3. The stress sensitivity analysis method for the fractured gas reservoir according to claim 1, wherein in S4, a calculation expression of the reservoir damage $$SI_p^k$$

is as follows:

$$SI_p^k = \frac{k_i - k}{k_i} = 1 - e^{-a\Delta\sigma}$$

wherein $k_i$ is the initial permeability in $\mu m^2$; k is a permeability under arbitrary stress in $\mu m^2$; $\Delta\sigma$ is an effective stress change value in MPa; $\alpha$ is the solution stress sensitivity coefficient in $MPa^{-1}$;

wherein a quantitative index for evaluating the stress sensitivity is that when $$SI_p^k$$

is 0-0.1, 0.1-0.3, 0.3-0.5, and >0.5, damage degrees are weak, medium, strong, and super strong, respectively.

* * * * *